US009707734B2

(12) United States Patent
Vucak et al.

(10) Patent No.: US 9,707,734 B2
(45) Date of Patent: Jul. 18, 2017

(54) MICROSTRUCTURED COMPOSITE PARTICLES

(75) Inventors: Marijan Vucak, Altendiez (DE); Christoph Nover, Rheinberg (DE)

(73) Assignee: Schaefer Kalk GmbH & Co. KG, Diez (DE)

( * ) Notice: Subject to any disclaimer, the term of this patent is extended or adjusted under 35 U.S.C. 154(b) by 403 days.

(21) Appl. No.: 14/004,763

(22) PCT Filed: Mar. 16, 2012

(86) PCT No.: PCT/EP2012/001197
§ 371 (c)(1),
(2), (4) Date: Sep. 12, 2013

(87) PCT Pub. No.: WO2012/126600
PCT Pub. Date: Sep. 27, 2012

(65) Prior Publication Data
US 2014/0004348 A1   Jan. 2, 2014

(30) Foreign Application Priority Data
Mar. 18, 2011   (EP) .................................... 11002245

(51) Int. Cl.
*B32B 5/16*   (2006.01)
*B01J 2/00*   (2006.01)
(Continued)

(52) U.S. Cl.
CPC ................. *B32B 5/16* (2013.01); *B01J 2/006* (2013.01); *C08J 3/128* (2013.01); *C09C 1/0081* (2013.01); *C09C 1/02* (2013.01); *C09C 1/021* (2013.01); *C09C 1/025* (2013.01); *B33Y 70/00* (2014.12); *C01P 2002/02* (2013.01); *C01P 2004/01* (2013.01); *C01P 2004/03* (2013.01);
(Continued)

(58) Field of Classification Search
None
See application file for complete search history.

(56) References Cited

U.S. PATENT DOCUMENTS 4,915,884 A   4/1990   Capdeville et al.
5,011,862 A   4/1991   Melber et al.
(Continued)

FOREIGN PATENT DOCUMENTS

DE   4244254 A1   7/1993
EP   0523372 A1   1/1993
(Continued)

OTHER PUBLICATIONS

McKetta (Encyclopedia of Chemical Processing and Design: vol. 12, Corrosion to Cottonseed (1981) pp. 88-89).*
(Continued)

*Primary Examiner* — Alexandre Ferre
(74) *Attorney, Agent, or Firm* — Marshall, Gerstein & Borun LLP

(57) ABSTRACT

Microstructured composite particles obtainable by a process in which large particles are bonded to small particles. The composite particles are preferably used as an additive, especially as a polymer additive, as an additive or starting material for the production of components, for applications in medical technology and/or in microtechnology and/or for the production of foamed articles.

21 Claims, 2 Drawing Sheets

(51) Int. Cl.
  *C08J 3/12*    (2006.01)
  *C09C 1/00*    (2006.01)
  *C09C 1/02*    (2006.01)
  *B33Y 70/00*   (2015.01)

(52) U.S. Cl.
  CPC ...... *C01P 2004/10* (2013.01); *C01P 2004/20* (2013.01); *C01P 2004/32* (2013.01); *C01P 2004/54* (2013.01); *C01P 2004/62* (2013.01); *C01P 2004/80* (2013.01); *C08J 2367/04* (2013.01); *Y10T 428/2991* (2015.01)

(56) References Cited

U.S. PATENT DOCUMENTS

| | | | |
|---|---|---|---|
| 5,122,418 A * | 6/1992 | Nakane et al. | 424/401 |
| 5,433,751 A * | 7/1995 | Christel | A61L 27/446 606/77 |
| 5,508,378 A * | 4/1996 | Ohara et al. | 528/354 |
| 5,626,861 A * | 5/1997 | Laurencin | A61L 27/46 424/426 |
| 6,403,219 B1 | 6/2002 | Liao | |
| 7,709,090 B2 * | 5/2010 | Nover et al. | 428/403 |
| 2003/0124242 A1 | 7/2003 | Kiefer et al. | |
| 2004/0146540 A1 * | 7/2004 | Ueda et al. | 424/401 |
| 2004/0234443 A1 * | 11/2004 | Chen et al. | 423/432 |
| 2012/0107612 A1 * | 5/2012 | Krishna Kar | A61L 27/46 428/407 |

FOREIGN PATENT DOCUMENTS

| | | |
|---|---|---|
| EP | 0922488 A2 | 6/1999 |
| EP | 2163569 A1 | 3/2010 |
| JP | 62083029 | 4/1987 |
| JP | 4139020 B2 | 8/2008 |

OTHER PUBLICATIONS

International Search Report for PCT/EP2012/001197 dated Sep. 28, 2012.
CayerBarrioz et al. 2006 pp. 989 dated Jun. 21, 2010.
Aveiia et al. 2005 pp. 131 to 136 dated Jul. 2, 2010.
Weihe et al. pp. 214 to 215 dated Aug. 13, 2010.
Jiang et al., Polymer Bulletin dated Jul. 5, 2010.
Wu et al., Biotechnl. Prog. 2003 datedJun. 27, 2003.
Lam et al., Materials Science and Engineering A dated Jul. 6, 2010.
Shi et al., Chromatographia 2003, 57 Jan. (No. 1/2).

* cited by examiner

MICROSTRUCTURED COMPOSITE PARTICLES

TECHNICAL FIELD

The present invention concerns microstructured composite particles, their methods of making and their use.

BACKGROUND ART

Composites are already known, a composite being an engineering material consisting of two or more combined materials which possesses properties as an engineering material not possessed by its individual components. Yet component properties as materials and component geometry do play a part in determining the properties of the composites. Size effects often play a particular part. The bond between the combined components is generally chemical or mechanical or a combination thereof.

Microstructured composite particles are also already known per se.

For example, European patent application EP 0 523 372 A1, by citing Japanese patent application JP62083029 A, discloses a process wherein a first material (referred to as "mother particles") is surface coated with a second material which consists of smaller particles (referred to as "baby particles"). This is preferably accomplished using a surface-modifying device ("hybridizer") which comprises a high-speed rotor, a stator and a sphere-shaped vessel, preferably comprising internal blades.

The mother and baby particles are mixed, preferably very finely divided and introduced into the hybridizer. There the mixture is preferably further very finely divided and preferably exposed repeatedly to mechanical forces, especially impact forces, compressive forces, frictional forces and shearing forces as well as the mutual interactions between the particles in order that the baby particles may become uniformly embedded in the mother particles.

Preferred rotor speeds are said to range from 50 m/s to 100 m/s, based on the circumferential velocity.

European patent application EP 0 523 372 A1 further describes fixing the composite particles by thermal spraying of a plasma, preferably by using a "reduced pressure plasma spraying device", which preferably has an output level of not less than 30 kW.

This method yields a medical material comprising a substrate of a material having high strength and high biostability and a layer formed thereon which is obtainable by plasma spraying a substance exhibiting high bioaffinity. Preferred substances exhibiting high bioaffinity include hydroxylapatite, tricalcium phosphate, bioglasses and other substances having similar properties.

German patent application DE 42 44 254 A1 relates to a process for producing composite particles by securing to the surface of a thermoplastic material having an average particle diameter of 100 µm to 10 mm a substance which has a smaller particle diameter and a better thermal stability than the thermoplastic material, said process comprising the steps of:

first heating the substance which has the smaller particle diameter and the better thermal stability than the thermoplastic material to a temperature not less than the softening point of the thermoplastic material while stirring in an apparatus having a stirring mechanism and a heating means;
introducing the thermoplastic material into the apparatus; and
securing the substance having the better thermal stability to the surface of the thermoplastic material.

It is stated that as thermoplastic material (mother particles) of composite particles there can be used for example pellets or beads of various commercially available thermoplastic resins or plastics, e.g., ABS, AS, MBS, polyvinyl chloride, polyacetal, polyamide, polyethylene, polypropylene, polyethylene terephthalate, polystyrene, polycarbonate, polyacrylates. It is stated that the average particle diameter of the mother particles is preferably in the range from 100 µm to 10 mm.

Particularly suitable examples of the substance (baby particles) are stated to include in particular particles of inorganic material, such as silicate-containing particles (e.g., glass beads and the like), alumina particles and zirconia particles and particles of various metals which are excellent in heat resistance and abrasion resistance. The average particle diameter of the baby particles is stated to be smaller than that of the mother particles, preferably amounting to 1/10 or less of the average particle diameter of the mother particles, i.e., typically in the range from 1 µm to 1 mm.

European patent application EP 0 922 488 A2 concerns solid composite particles obtained by modifying the surface of a solid particle by securing fine particles to the surface of the particle which acts as a core and allowing a crystal or crystals of the fine particles to grow on a combination of the core and the fine particles in order to unalterably fix the fine particles on the core particle in a peel-resistant manner.

Suitable cores include inter alia cellulose derivatives, starch derivatives and also synthetic polymers, such as nylon, polyethylene and polystyrene.

Suitable fine particles include inter alia carbonates, phosphates and hydrogenphosphates, such as calcium monohydrogenphosphate.

U.S. Pat. No. 6,403,219 B1 discloses solid composite particles obtained by modifying the surface of a solid core particle by securing particles to the surface of the core particle in a non-peelable manner and allowing a crystal of a tied-down particulate component to grow in columnar or acicular fashion on the core particle, the tied-down particles being in a state of adhesive attachment to the surface of the core particle.

Suitable cores include inter alia cellulose derivatives, starch derivatives and also synthetic polymers, such as nylon, polyethylene and polystyrene.

Suitable fine particles include inter alia carbonates, phosphates and hydrogenphosphates, such as calcium monohydrogenphosphate.

The working example of this printed publication describes the preparation of composite particles from nylon 12 having an average particle diameter of 50 µm and tabular calcium monohydrogenphosphate having an average side length of about 50 µm, in a quantitative ratio of 10:1. The composite particles are obtained using a surface-modifying device (Nara Machinery Co. NHS-0). First a powder consisting of nylon 12 and calcium monohydrogenphosphate are treated with the surface-modifying device and the resulting product is then suspended in a suspension of calcium monohydrogenphosphate in order to allow the crystals to grow on the surface. The procedure of the U.S. Pat. No. 6,403,219 B1 patent is therefore associated with appreciable cost and inconvenience.

Japanese patent application JP 9239020 A describes an implant material for hard tissues which comprises composite particles wherein particles comprising a material having bioaffinity, for example hydroxylapatite or tricalcium phosphate, have a coating comprising a material of high hardness, for example zirconia or alumina.

Patent application US 2003/0124242 A1 concerns capsules having a mineral coating and a core comprising a polyhydroxylated compound.

The constituents of the mineral coating are stated to be alkaline earth metal carbonates or basic carbonates, basic transition metal carbonates, alkaline earth metal or transition metal sulfates, alkaline earth metal borates, alkaline earth metal halides and precipitated silica. Preferred alkaline earth metals are stated to include magnesium and calcium.

The polyhydroxylated compound is stated to include polysaccharides, such as threose, erythrose, arabinose, xylose, ribose, deoxyribose, rhamnose, fucose, glucosamine, galactosamine, N-acetylglucosamine, N-acetylgalactosamine, starch, amylopectin, amylose, araban, alginates, carrageenan, cellulose, chitosan, chondroitin sulfate, dextran, dextrin, fructosan, galactan, mannan, gum arabic, pectin, gum ghatti, galactoside, glycan, glycogen, hemicellulose, hyaluronic acid, inulin, lamarinarin, levan, mucoitin sulfate, nigeran, pentosan, polydextrose and xylan.

The examples of this printed publication describe the preparation of composite particles from guar having an average particle size of 32 µm and hydroxylapatite having an average particle size of 1.5 µm or from starch having an average particle size of 10 µm and calcium phosphate having an average particle size of 1 µm. The composite particles are each obtained using a surface-modifying device (Nara Machinery Co. NHS-0).

U.S. Pat. No. 5,011,862 describes hollow thermoplastic spheres, for example in PVC, PAN, polyalkyl methacrylate, PS, which include opacifiers such as $TiO_2$, $ZnO$, $CaCO_3$, talc, clay minerals or the like secured to or embedded in the surface thereof.

U.S. Pat. No. 4,915,884 discloses a granular material obtained by homogeneous mixing of a thermoplastic resin, such as PE for example, and of an adjuvant, such as calcium carbonate for example, subsequent extrusion of this mixture and comminution of the resulting strand of extrudate.

European patent application EP 2163 569 A1 concerns a process for producing resin particles from an acidic-group-containing thermoplastic resin or elastomer and a filler, for example calcium carbonate. The process produces resin particles by melting and mixing an acidic-group-containing thermoplastic resin or elastomer with filler particles and a water-soluble material in order to provide a resin composition comprising fine particles of resin which are formed by the thermoplastic resin and the filler particles. The resin composition is dispersed in a matrix including the water-soluble material. The matrix component is subsequently removed again from the resin composition in order to give the resin particles. The resulting resin particles each include a core particle, which includes the acidic-group-containing thermoplastic resin or elastomer, and filler particles immobilized on the outside surface of the core particle. This specific, extremely costly and inconvenient procedure of this printed publication leads to a porous structure on the part of the resin particles.

The printed publications Y. Shi, Y. Sun Fabrication and Characterization of a Novel Biporous Spherical Adsorbent for Protein Chromatography Chromatographia 2003, 57, pp. 29-35 and L. Wu, S. Bai and Y. Sun Development of Rigid Bidisperse Porous Microspheres for High-Speed Protein Chromatography Biotechnol. Prog. 2003, 19, pp. 1300-1306 describe the production of polymer beads by suspension polymerization of polyglycidyl methacrylate copolymers in the presence of superfine calcium carbonate. After polymerization, the calcium carbonate is leached out in order to obtain polymer beads having porous structures.

None of the aforementioned printed publications contemplates the use of precipitated calcium carbonate (PCC) particles or of resorbable polyesters as a constituent part of the composite particles described.

Again, the use of precipitated calcium carbonate in conjunction with molding compounds is already known in the literature, but again not as a constituent part of composite particles.

Thus, the publication T. D. Lam, T. V. Hoang, D. T. Quang, J. S. Kim Effect of nanosized and surface-modified precipitated calcium carbonate on properties of $CaCO_3$/polypropylene nanocomposites Materials Science and Engineering A 501 (2009) 87-93 describes the effect of surface-modified calcium carbonate nanoparticles on the properties of $CaCO_3$-polypropylene nanocomposites. However, the calcium carbonate particles therein are homogeneously dispersed in the polymer as a filler.

The publication L. Jiang, Y. C. Lam, K. C. Tam, D. T. Li, J. Zhang The influence of fatty acid coating on the rheological and mechanical properties of thermoplastic polyurethane (TPU)/nano-sized precipitated calcium carbonate (NPCC) composites Polymer Bulletin 57, 575-586 (2006) attends to the influence of fatty acid coatings on the rheological and mechanical properties of composites comprising thermoplastic polyurethane and precipitated calcium carbonate nanoparticles. Again, the calcium carbonate particles are homogeneously dispersed in the polymer as a filler.

The paper J. Cayer-Barrioz, L. Ferry, D. Frihi, K. Cavalier, R. Séguéla, G. Vigier Microstructure and Mechanical Behavior of Polyamide 66-Precipitated Calcium Carbonate Composites: Influence of the Particle Surface Treatment Journal of Applied Polymer Science, Vol. 100, 989-999 (2006) relates to the microstructure and the mechanical behavior of composites comprising polyamide 66 and precipitated calcium carbonate nanoparticles. Again, the calcium carbonate particles are homogeneously dispersed in the polymer as a filler.

Japanese patent application JP 41 39020 A describes the polymerization of polybasic carboxylic acids or polyfunctional isocyanates in a calcium carbonate composition comprising colloidal or particulate calcium carbonate. Again, the calcium carbonate particles are homogeneously dispersed in the polymer as a filler.

The publication M. Avella, S. Cosco, M. L. Di Lorenzo, E. Di Pace, M. E. Errico Influence of $CaCO_3$ Nanoparticles Shape on Thermal and Crystallization Behavior of Isotactic Polypropylene based Nanocomposites Journal of Thermal Analysis and calorimetry, Vol. 80 (2005) 131-136 describes the influence of the shape of $CaCO_3$ nanoparticles on the thermal and crystallization behavior of isotactic nanocomposites based on polypropylene. The calcium carbonate particles are homogeneously dispersed in the polymer as a filler.

The publication S. Weihe, M. Wehmöller, C. Schiller, C. Rasche, H. Eufinger, M. Epple Formgebung degradierbarer Werkstoffe mit Hilfe der Verfahrenskette zur Fertigung individueller CAD/CAM-Implantate Biomedizinische Technik/Biomedical Engineering, volume 46, number s1, pages 214-215 discloses an implant production by melt pressing of polyglycolide-co-lactide (PGLA), poly-L-lactide (PLLA) and graduated engineering materials consisting of multiple polymers and pressing by using a stainless steel mold.

Also described is a gas introduction process using poly-DL-lactide (PDLLA) and a Teflon mold. The process is based on $CO_2$ being introduced under high pressure at room temperature. The CO2 is taken up by the polymer, lowering the glass transition temperature thereof. Pressure reduction causes the amorphous PDLLA to foam up and exactly fill out the mold. The process is stated to thereby enable the incorporation of thermolabile substances, for example antibiotics and osteoinductive proteins, and also to be employable for other amorphous polymers, for example PGLA.

One disadvantage of conventional polylactide implant materials is that they are invisible in an x-radiograph. Measurement of treatment progress by x-raying is accordingly impossible.

SUMMARY OF THE INVENTION

It is an object of the present invention to provide as efficient and economical a solution as possible to the following problems in particular:

Firstly the problem of specifically improving the properties of polymers, preferably of thermoplastically processable polymers, more preferably of polyamides and of resorbable polymers, preferably of resorbable polyesters, especially of poly-D-, poly-L- and/or poly-D,L-lactic acid, preferably with regard to their mechanical properties and/or their suitability for biomedical applications;

secondly the problem of dispersing calcium salts, especially calcium carbonate, very homogeneously in a polymer, preferably in a thermoplastically processable polymer, more preferably in a polyamide and/or a resorbable polymer, preferably in a resorbable polyester, especially poly-D-, poly-L- and/or poly-D,L-lactic acid.

The solution which the invention provides to these problems should be realizable in a very simple and very inexpensive manner.

The resultant polymers shall further be further processable in a very simple manner.

There was a particular desire for very good mechanical properties and also very good pH stabilization, which are advantageous for applications in the biomedical sector in particular.

The problem addressed by the present invention was further that of providing materials, especially for biomedical use, which possess very good resorbability.

A particular desire was a solution to the problem of resorbable polyesters, especially polylactic acid, being of only limited usefulness for laser sinter applications, since grinding them to particle sizes below 150 µm, advantageously below 125 µm and especially in the range from 50 µm to 70 µm is only possible, if at all, with great difficulty. Desirable solutions in this context substantially prevent any dusting of the ground product and more particularly permit it also to be used for the manufacture of microcomponents and in cleanrooms.

The problem addressed by the present invention is further that of improving the properties of polymer foams, especially of polymer foams for biomedical applications, such as implants.

The problem addressed by the present invention is finally also that of devising as simple a way as possible to determine and measure treatment progress for use of implant materials.

These objects and further objects not specifically mentioned but directly derivable from the above contexts are achieved by providing microstructured composite particles as described below. Particularly advantageous uses of the composite particles according to the present invention are also protected.

The aforementioned problems are unexpectedly solved in an extremely efficient and inexpensive manner by making available microstructured composite particles obtainable by a process comprising combining large particles with small particles, wherein the large particles have an average particle diameter in the range from 0.1 µm to 10 mm, the average particle diameter of the small particles is not more than ¹/₁₀ of the average particle diameter of the large particles, the large particles comprise at least one polymer, the small particles comprise at least one calcium salt, the small particles form an arrangement on the surface of the large particles and/or an inhomogeneous distribution within the large particles, the small particles comprise precipitated particles of calcium carbonate which have an average particle size in the range from 0.01 µm to 1.0 mm, and/or the large particles comprise at least one resorbable polyester having a number-average molecular weight in the range from 500 g/mol to 1,000,000 g/mol.

First, adding the composite particles of the present invention as an additive to thermoplastically processable polymers, in particular to thermoplastic polymers, preferably to polyamides and to resorbable polymers, preferably to resorbable polyesters, especially to poly-D-, poly-L- and/or poly-D,L-lactic acid, improves the properties thereof, in particular their mechanical properties and also their suitability for biomedical applications, in a specific manner.

It is further possible in this way to disperse calcium salts, especially calcium carbonate, extremely homogeneously in a polymer, preferably in a thermoplastically processable polymer, more preferably in a polyamide and/or in a resorbable polymer, preferably in a resorbable polyester, especially in poly-D-, poly-L- and/or poly-D,L-lactic acid.

The resultant polymers can be further processed in a similarly simple manner.

Comparing the individual particles with each other, the composite particles of the present invention are found to be very uniform and characterized by a very high level of homogeneity, both with regard to their composition and with regard to their structure.

The composite particles of the present invention further generally have improved mechanical properties and also an improved pH stabilization, both as an individual component and as an additive in a matrix polymer, each compared with the purely thermoplastic polymer or polymer mixture. These properties make them particularly useful for applications in the biomedical sector.

The composite particles of the present invention further have very good resorbability, especially in the human organism.

The composite particles of the present invention are grindable in a comparatively simple manner. Dust formation is extremely low during grinding, since adhering together of polymer particles is reduced by the calcium salt, especially by the calcium carbonate, and a better ground result is obtained. Furthermore, any local overheating of the millbase is avoided in the best possible manner, so even thermally degradable polymers can be processed with the greatest of ease. Moreover, separate addition of the individual components (calcium salt and polymer) is avoided, which likewise leads to a distinct reduction in dust formation during processing. Altogether, therefore, this procedure facilitates the controlled adjustment of the particle size of the ground particles, of their flow properties, of their free-flowability and also of their dust propensity and thus particularly also the use of the ground products in ultrathin sheets and in dust-sensitive applications, including particularly the production of microcomponents and for the use in cleanrooms. In addition, dust propensity is also not observed with the unground composite particles. The solution according to the present invention is accordingly particularly useful for the production of polylactic acid particles for rapid prototyping (additive methods of fabrication), especially for laser sintering applications, wherein the average particle size of the polylactic acid particles is preferably below 150 µm, more preferably below 125 µm and especially in the range from 50 µm to 70 µm.

The properties of polymer foams, especially of polymer foams for biomedical applications, such as implants, are also distinctly improved.

In addition, use of composite particles according to the present invention in implant materials also facilitates a comparatively simple measurement and verification of treatment progress, since the composite particles of the present invention are visible in x-radiographs and therefore the implant is directly observable in the body by x-raying.

The present invention accordingly provides microstructured composite particles obtainable by a process comprising combining large particles with small particles.

Microstructure is the term used in the present invention to designate the microscopic properties of a material. They include the grain structure as well as the resolvable microstructure. These are absent in liquids and gases. There the individual atoms or molecules are in an orderless state. Amorphous solid-state bodies usually have some structural short-distance order on the scale of neighboring atoms, but no long-distance order. Crystalline solid-state bodies, by contrast, have an orderly lattice structure on the long—as well as short-distance scale.

In the context of the present invention, the large particles comprise at least one polymer.

In the case of the composite particles according to one embodiment, this polymer is in principle not subject to any further restrictions. Preferably, however, it is a thermoplastic polymer, advantageously a biopolymer, a rubber, especially natural rubber or synthetic rubber, and/or a polyurethane.

The term "thermoplastic polymer" refers in this context to a plastic which is (thermoplastically) formable in a certain temperature range, preferably in the range from 25° C. to 350° C. This operation is reversible in that it can be repeated, by cooling down and reheating into the liquid-melt state, as often as desired, as long as the so-called thermal decomposition of the material does not ensue through overheating. Thermoplastic polymers differ in this from the thermosets and elastomers.

The term "biopolymer" refers to an engineering material which consists of biogenic (renewable) raw materials and/or is biodegradable (biogenic and/or biodegradable polymer). This term accordingly subsumes biobased biopolymers, which are biodegradable or else nonbiodegradable, but also biodegradable petroleum-based polymers. This effects a delimitation from the conventional, petroleum-based plastics/engineering materials, which are not biodegradable, e.g., polyethylene (PE), polypropylene (PP) and polyvinyl chloride (PVC).

The term "rubber" refers to an uncrosslinked, high molecular weight, polymeric material having elastomeric properties at room temperature (25° C.). At higher temperatures or under the influence of forces of deformation, a rubber exhibits an increasing viscous flow and thus enables it to be subjected to forming under suitable conditions.

Elastomeric behavior is characterized by a relatively low shear modulus with rather low dependence on temperature. It is caused by changes in entropy. Stretching forces the elastomeric material into a higher-order configuration, which leads to a decrease in entropy. On removing the force, the polymers accordingly return into their original position and the entropy goes back up.

The term "polyurethane" (PU, German standard specification DIN code: PUR) designates a plastic or a synthetic resin formed in either case from the polyaddition reaction of diols or polyols with polyisocyanates. The urethane group is characteristic of a polyurethane.

Thermoplastic polymers are used with particular preference in the context of the present invention. Particularly suitable polymers include the following polymers: acrylonitrile-ethylene-propylene-(diene)-styrene copolymer, acrylonitrile-methacrylate copolymer, acrylonitrile-methyl methacrylate copolymer, acrylonitrile-chlorinated polyethylene-styrene copolymer, acrylonitrile-butadiene-styrene copolymer, acrylonitrile-ethylene-propylene-styrene copolymer, aromatic polyesters, acrylonitrile-styrene-acrylic ester copolymer, butadiene-styrene copolymer, cellulose acetate, cellulose acetobutyrate, cellulose acetopropionate, hydrogenated cellulose, carboxymethylcellulose, cellulose nitrate, cellulose propionate, cellulose triacetate, polyvinyl chloride, ethylene-acrylic acid copolymer, ethylene-butyl acrylate copolymer, ethylene-chlorotrifluoroethylene copolymer, ethylene-ethyl acrylate copolymer, ethylene-methacrylate copolymer, ethylene-methacrylic acid copolymer, ethylene-tetrafluoroethylene copolymer, ethylene-vinyl alcohol copolymer, ethylene-butene copolymer, ethylcellulose, polystyrene, polyfluoroethylenepropylene, methyl methacrylate-acrylonitrile-butadiene-styrene copolymer, methyl methacrylate-butadiene-styrene copolymer, methylcellulose, polyamide 11, polyamide 12, polyamide 46, polyamide 6, polyamide 6-3-T, polyamide 6-terephthalic acid copolymer, polyamide 66, polyamide 69, polyamide 610, polyamide 612, polyamide 6I, polyamide MXD 6, polyamide PDA T, polyamide, polyaryl ether, polyaryl ether ketone, polyamide imide, polyarylamide, polyaminobismaleimide, polyarylates, poly-1-butene, polybutyl acrylate, polybenzimidazole, polybismaleimide, polyoxadiazobenzimidazole, polybutylene terephthalate, polycarbonate, polychlorotrifluoroethylene, polyethylene, polyester carbonate, polyaryl ether ketone, polyether ether ketone, polyether imide, polyether ketone, polyethylene oxide, polyaryl ether sulfone, polyethylene terephthalate, polyimide, polyisobutylene, polyisocyanurate, polyimide sulfone, polymethacrylimide, polymethacrylate, poly-4-methyl-1 pentene, polyacetal, polypropylene, polyphenylene oxide, polypropylene oxide, polyphenylene sulfide, polyphenylene sulfone, polystyrene, polysulfone, polytetrafluoroethylene, polyurethane, polyvinyl acetate, polyvinyl alcohol, polyvinyl butyral, polyvinyl chloride, polyvinylidene chloride, polyvinylidene fluoride, polyvinyl fluoride, polyvinyl methyl ether, polyvinylpyrrolidone, styrene-butadiene copolymer, styrene-isoprene copolymer, styrene-maleic anhydride copolymer, styrene-maleic anhydride-butadiene copolymer, styrene-methyl methacrylate copolymer, styrene-methylstyrene copolymer, styrene-acrylonitrile copolymer, vinyl chloride-ethylene copolymer, vinyl chloride-methacrylate copolymer, vinyl chloride-maleic anhydride copolymer, vinyl chloride-maleimide copolymer, vinyl chloride-methyl methacrylate copolymer, vinyl chloride-octyl acrylate copolymer, vinyl chloride-vinyl acetate copolymer, vinyl chloride-vinylidene chloride copolymer and vinyl chloride-vinylidene chloride-acrylonitrile copolymer.

The use of the following rubbers is further also particularly advantageous: naturally occurring polyisoprene, especially cis-1,4-polyisoprene (natural rubber; NR) and trans-1,4-polyisoprene (guttapercha), particularly natural rubber; nitrile rubber (copolymer of butadiene and acrylonitrile; poly(acrylonitrile-co-1,3-butadiene); NBR; so-called Buna N rubber); butadiene rubber (polybutadiene; BR); acrylic rubber (polyacrylic rubber; ACM, ABR); fluororubber (FPM); styrene-butadiene rubber (copolymer of styrene and butadiene; SBR); styrene-isoprene-butadiene rubber (copolymer of styrene, isoprene and butadiene; SIBR); polybutadiene; synthetic isoprene rubber (polyisoprene; IR); ethylene-propylene rubber (copolymer of ethylene and propylene; EPM); ethylene-propylene-diene rubber (terpolymer of ethylene, propylene and a diene monomer component; EPDM); butyl rubber (copolymer of isobutylene and isoprene; IIR); ethylene-vinyl acetate rubber (copolymer of ethylene and vinyl acetate; EVM); ethylene-methyl acrylate rubber (copolymer of ethylene and methyl acrylate; AEM); epoxyrubber, such as polychloromethyloxirane (epichlorohydrin polymer; CO), ethylene oxide (oxirane)—chloromethyloxirane (epichlorohydrin polymer; ECO), epichlorohydrin—ethylene oxide—allyl glycidyl ether terpolymer (GECO), epichlorohydrin—allyl glycidyl ether copolymer (GCO) and propylene oxide—allyl glycidyl ether copolymer (GPO); polynorbornene rubber (polymer of bicyclo[2.2.1]hept-2-ene (2-norbornene); PNR); polyalkenylene (polymer of cycloolefins); silicone rubber (Q), such as silicone rubber exclusively with methyl substituents on the polymer chain (MQ; e.g., dimethylpolysiloxane), silicone rubber with methylvinyl and vinyl substituent groups on the polymer chain (VMQ), silicone rubber with phenyl and methyl substituents on the polymer chain (PMQ), silicone rubber with fluoro and methyl groups on the polymer chain (FMQ), silicone rubber with fluoro, methyl and vinyl substituents on the polymer chain (FVMQ); polyurethane rubber; thiol rubber; halobutylrubber, such as bromobutylrubber (BIIR) and chlorobutylrubber (CIIR); chloropolyethylene (CM); chlorosulfonylpolyethylene (CSM); hydrogenated nitrile rubber (HNBR); and polyphosphazene.

Particularly preferred nitrile rubbers include random terpolymers of acrylonitrile, butadiene and a carboxylic acid, such as methacrylic acid. In this context, the nitrile rubber preferably comprises, based on the overall weight of the polymer, the following main components: 15.0 wt % to 42.0 wt % of acrylonitrile polymer; 1.0 wt % to 10.0 wt % of carboxylic acid and the remainder is predominantly butadiene (e.g., 38.0 wt % to 75.0 wt %). The composition is typically: 20.0 wt % to 40.0 wt % of acrylonitrile polymer, 3.0 wt % to 8.0 wt % of carboxylic acid and 40.0 wt % to 65.0 wt % or 67.0 wt % is butadiene. Particularly preferred nitrile rubbers include a terpolymer of acrylonitrile, butadiene and a carboxylic acid where the acrylonitrile content is less than 35.0 wt % and the carboxylic acid content is less than 10.0 wt %, the butadiene content accounting for the remaining rest. Still more preferred nitrile rubbers can comprise the following amounts: 20.0 wt % to 30.0 wt % of acrylonitrile polymer, 4.0 wt % to 6.0 wt % of carboxylic acid and the remainder is predominantly butadiene.

The use of nitrogenous polymers, especially polyamides, is particularly favorable in the context of the present invention. Particular preference is given to polyamide 11, polyamide 12, polyamide 46, polyamide 6, polyamide 6-3-T, polyamide 6 terephthalic acid copolymer, polyamide 66, polyamide 69, polyamide 610, polyamide 612, polyamide 6I, polyamide MXD 6 and/or polyamide PDA-T, especially polyamide 12.

The use of resorbable polymers, especially resorbable polyesters, is further also particularly advantageous. The term "resorption" (from the Latin resorbere="to suck up") is to be understood as meaning the uptake of substances in biological systems, especially into the human organism. Especially such materials as can be used for the production of resorbable implants are of interest here.

Resorbable polymers that are particularly preferred according to the present invention comprise repeat units of lactic acid, of hydroxybutyric acid and/or of glycolic acid, preferably of lactic acid and/or of glycolic acid, especially of lactic acid. Polylactic acids are particularly preferred. The use of poly(dioxanone) is also particularly advantageous.

"Polylactic acid" is herein to be understood as referring to polymers constructed from lactic acid units. Such polylactic acids are typically produced by condensation of lactic acids, but are also obtained in the ring-opening addition polymerization of lactides under suitable conditions.

Resorbable polymers which are particularly suitable according to the present invention include poly(glycolide-co-L-lactide), poly(L-lactide), poly(L-lactide-co-caprolactone), poly(L-lactide-co-glycolide), poly(L-lactide-co-D,L-lactide), poly(D,L-lactide-co-glycolide) and also poly (dioxanone). Polymers of this type are commercially available, for example from Boehringer Ingelheim Pharma KG (Germany) under the trade names of Resomer® GL 903, Resomer® L 206 S, Resomer® L 207 S, Resomer® L 209 S, Resomer® L 210, Resomer® L 210 S, Resomer® LC 703 S, Resomer® LG 824 S, Resomer® LG 855 S, Resomer® LG 857 S, Resomer® LR 704 S, Resomer® LR 706 S, Resomer® LR 708, Resomer® LR 927 S, Resomer® RG 509 S and Resomer® X 206 S.

Resorbable polymers which are particularly advantageous for the purposes of the present invention are preferably resorbable polyesters, more preferably lactic acid polymers, especially poly-D-, poly-L- or poly-D,L-lactic acids, and have a number-average molecular weight (Mn), preferably determined by gel permeation chromatography against narrowly distributed polystyrene standards or by end group titration, above 500 g/mol, preferably above 1000 g/mol, more preferably above 5000 g/mol, even more preferably above 10 000 g/mol and especially above 25 000 g/mol. On the other hand, the number average of preferred resorbable polymers is below 1,000,000 g/mol, advantageously below 500 000 g/mol, more favorably below 100 000 g/mol and especially not more than 50 000 g/mol. A number-average molecular weight in the range from 500 g/mol to 50 000 g/mol has been found to be very particularly advantageous in the context of the present invention.

The weight-average molecular weight (Mw) of preferred resorbable polymers—which are preferably resorbable polyesters, more favorably lactic acid polymers, especially poly-D-, poly-L- or poly-D,L-lactic acids—is preferably determined by gel permeation chromatography against narrowly distributed polystyrene standards and especially in the range from 750 g/mol to 5 000 000 g/mol, more preferably in the range from 750 g/mol to 1,000,000 g/mol, even more preferably in the range from 750 g/mol to 500 000 g/mol and especially in the range from 750 g/mol to 250 000 g/mol, and the polydispersity of these polymers is advantageously in the range from 1.5 to 5.

The inherent viscosity of particularly suitable resorbable polymers, preferably resorbable polyesters, more preferably lactic acid polymers, especially poly-D-, poly-L- or poly-D,L-lactic acids, as measured in chloroform at 25° C., 0.1% polymer concentration, is in the range from 0.5 dl/g to 8.0 dl/g, preferably in the range from 0.8 dl/g to 7.0 dl/g and especially in the range from 1.5 dl/g to 3.2 dl/g.

Furthermore, when measured in hexafluoro-2-propanol at 30° C., 0.1% polymer concentration, the inherent viscosity of particularly suitable resorbable polymers, preferably resorbable polyesters, advantageously lactic acid polymers, especially poly-D-, poly-L- or poly-D,L-lactic acids, is in the range from 1.0 dl/g to 2.6 dl/g and especially in the range from 1.3 dl/g to 2.3 dl/g.

Polymers, especially thermoplastic polymers, having a glass transition temperature above 20° C., advantageously above 25° C., preferably above 30° C., more preferably above 35° C. and especially above 40° C., are also extremely advantageous in the context of the present invention. In a very particularly preferred embodiment of the present invention, the glass transition temperature of the polymer is in the range from 35° C. to 55° C., and especially in the range from 40° C. to 50° C.

Polymers having a melting temperature above 50° C., advantageously of not less than 60° C., preferably of above 150° C., more preferably in the range from 160° C. to 210° C. and especially in the range from 175° C. to 195° C. are further particularly suitable.

The glass transition temperature and the melting temperature of the polymer are preferably determined using differential scanning calorimetry (DSC). The following procedure has proved very particularly advantageous in this context:

Performance of DSC measurement under nitrogen on a Mettler-Toledo DSC 30S. The calibration is preferably done with indium. The measurements are preferably carried out under dry oxygen-free nitrogen (flow rate: preferably 40 ml/min). Sample weight is preferably chosen to be between 15 mg and 20 mg. The samples are first heated from 0° C. to preferably a temperature above the melting temperature of the polymer under investigation, then cooled down to 0° C. and heated a second time from 0° C. to said temperature at a heating rate of 10° C./min.

Very particular preference for use as thermoplastic polymers is given to polyamides and resorbable polymers, especially resorbable polyesters, particularly lactic acid polymers.

In the case of the composite particles according to claim 2, the present invention requires that the large particles comprise at least one resorbable polyester having a number-average molecular weight in the range from 500 g/mol to 1,000,000 g/mol. On this premise, the above-described preferred versions regarding the polymer of the large particles also apply to this embodiment of the present invention.

In the context of the present invention, the small particles of the composite particles comprise at least one calcium salt.

In the case of the composite particles according to another embodiment, this calcium salt is in principle not subject to any further restrictions. Preferably, however, what is concerned is at least one calcium carbonate, especially at least one precipitated calcium carbonate.

The shape of the particles of calcium salt, preferably the particles of calcium carbonate, especially the precipitated particles of calcium carbonate, is not subject to any further restrictions and can be adapted to the concrete purpose of use. However, preference is given to using scalenohedral, rhombohedral, needle-shaped, platelet-shaped or sphere-shaped (spherical) particles. A very particularly preferred embodiment of the present invention uses sphere-shaped calcium salt, preferably calcium carbonate, especially sphere-shaped precipitated particles of calcium carbonate, since these normally have an isotropic profile of properties.

Accordingly, the resultant composite particles are likewise advantageously characterized by as isotropic a profile of properties as possible.

The aspect ratio of the calcium salt particles, preferably of the calcium carbonate particles, especially of the precipitated particles of calcium carbonate, is preferably below 5, more preferably below 4, even more preferably below 3, advantageously below 2, yet even more preferably below 1.5, yet still even more preferably in the range from 1.0 to 1.25, preferably below 1.1, especially below 1.05.

The aspect ratio of the calcium salt particles refers in this context to the quotient formed from the maximum particle diameter and minimum particle diameter. It is preferably determined as a (number) average value using electron micrographs. In this context, it is preferable to only consider particles having a particle size in the range from 0.1 µm to 30.0 µm for sphere-shaped particles of calcium salt. It is preferable to only consider particles having a particle size in the range from 0.1 µm to 20.0 µm for rhombohedral particles of calcium salt. It is preferable to only consider particles having a particle size in the range from 0.1 µm to 2.0 µm for other particles of calcium salt.

Furthermore, it is preferable for not less than 90%, advantageously not less than 95% of all the particles to have an aspect ratio of below 5, preferably below 4, more preferably below 3, advantageously below 2, even more preferably below 1.5, yet even more preferably in the range from 1.0 to 1.25, preferably below 1.1, especially below 1.05.

Sphere-shaped particles of calcium salt are further very particularly advantageous, and they are preferably predominantly present as individual particles. Minor deviations from the perfect shape of a sphere are accepted here as long as the properties of the particles are not fundamentally changed. The particle surface can accordingly exhibit occasional defects or additional deposits.

In the context of a particularly preferred version of the present invention, the particles of calcium salt, preferably the particles of calcium carbonate and especially the precipitated particles of calcium carbonate are preferably sphere-shaped and essentially amorphous. The term "amorphous" at this juncture refers to calcium salt forms where the atoms form at least in part an irregular pattern and not orderly structures and therefore only have a short-range order but not a long-range order. This differs from crystalline forms of calcium salt, for example calcite, vaterite and aragonite, where the atoms have a long-range order as well as a short-range order.

However, in the context of this preferred version of the present invention, the presence of crystalline constituents is not categorically ruled out. Preferably, however, the proportion of crystalline calcium salts, especially crystalline calcium carbonate, is below 50 wt %, more preferably below 30 wt %, even more preferably below 15 wt %, especially below 10 wt %. In the context of a particularly preferred version of the present invention, the proportion of crystalline calcium salts, especially crystalline calcium carbonate, is below 8.0 wt %, preferably below 6.0 wt %, advantageously below 4.0 wt %, more preferably below 2.0 wt %, even more preferably below 1.0 wt %, especially below 0.5 wt %, all based on the overall weight of calcium salt.

The method of x-ray diffraction with an internal standard, preferably quartz, in conjunction with a Rietveld refinement has been found to be very particularly advantageous for determining the amorphous and crystalline fractions.

In the context of this preferred embodiment of the present invention, the particles of calcium salt, preferably the preferably amorphous particles of calcium carbonate, are advantageously stabilized by at least one substance, especially at least one surface-active substance, said at least one substance preferably forming an arrangement on the surface of the particles of calcium salt, especially on the surface of the preferably sphere-shaped particles of calcium carbonate. "Surface-active substances" for the purposes of the present invention are advantageously organic compounds which from their solution tend to congregate at interfaces (water/particle of calcium salt, preferably particle of calcium carbonate) and lower the surface tension, preferably measured at 25° C., as a result. Reference for further details is made to the technical literature, especially to Römpp-Lexikon Chemie/eds. Jürgen Falbe; Manfred Regitz. revised by Eckard Amelingmeier; Stuttgart, New York; Thieme; volume 2: Cm-G; 10th edition (1997); headword: "surface-active substances".

The substance, especially the surface-active substance, preferably has a molar mass above 100 g/mol, preferably above 125 g/mol, especially above 150 g/mol, and satisfies the formula R—$X_n$.

The radical R therein represents a radical comprising at least 1, preferably at least 2, more preferably at least 4, even more preferably at least 6 and especially at least 8 carbon atoms, and preferably represents an aliphatic or cycloaliphatic radical which may optionally comprise further radicals X and which may optionally have one or more ether linkages.

The radical X represents a group comprising at least one oxygen atom and also at least one carbon atom, sulfur atom, phosphorus atom and/or nitrogen atom, preferably at least one phosphorus atom and/or at least one carbon atom. The following groups are particularly preferred:

carboxylic acid groups —COOH,
carboxylate groups —COO$^-$,
sulfonic acid groups —SO$_3$H,
sulfonate groups —SO$_3^-$,
hydrogensulfate groups —OSO$_3$H,
sulfate groups —OSO$_3^-$,
phosphonic acid groups —PO$_3$H$_2$,
phosphonate groups —PO$_3$H$^-$, —PO$_3^{2-}$,
amino groups —NR$^1$R$^2$ and also
ammonium groups —N$^+$R$^1$R$^2$R$^3$, especially carboxylic acid groups, carboxylate groups, phosphonic acid groups and phosphonate groups.

The radicals R$^1$, R$^2$ and R$^3$ in this context independently of each other represent hydrogen or an alkyl group of 1 to 5 carbon atoms. One of R$^1$, R$^2$ and R$^3$ can also be an R radical.

Preferred counter-ions to the aforementioned anions are metal cations, especially alkali metal cations, preferably Na$^+$ and K$^+$, and also ammonium ions.

Preferred counter-ions to the aforementioned cations are hydroxyl ions, hydrogencarbonate ions, carbonate ions, hydrogensulfate ions, sulfate ions and halide ions, especially chloride and bromide ions.

n represents a preferably whole number in the range from 1 to 20, preferably in the range from 1 to 10 and especially in the range from 1 to 5.

Substances particularly suitable for the purposes of the present invention include alkylcarboxylic acids, alkyl carboxylates, alkylsulfonic acids, alkyl sulfonates, alkyl sulfates, alkyl ether sulfates having preferably 1 to 4 ethylene glycol ether units, fatty alcohol ethoxylates having preferably 2 to 20 ethylene glycol ether units, alkylphenol ethoxylates, optionally substituted alkylphosphonic acids, optionally substituted alkyl phosphonates, sorbitan fatty acid esters, alkylpolyglucosides, N methylglucamides, homo- and copolymers of acrylic acid and also their corresponding salt forms and block copolymers.

A first group of very particularly advantageous substances are optionally substituted alkylphosphonic acids, especially amino-tri-(methylenephosphonic acid), 1-hydroxyethylene-(1,1-diphosphonic acid), ethylenediamine-tetra-(methylenephosphonic acid), hexamethylenediamine-tetra-(methylenephosphonic acid), diethylenetriamine-penta-(methylenephosphonic acid), and also optionally substituted alkyl phosphonates, especially of the aforementioned acids. These compounds are known as multifunctional sequestrants for metal ions and scale inhibitors.

Homo- and copolymers, preferably homopolymers, of acrylic acid and also their corresponding salt forms have further also proved particularly advantageous, especially those which have a weight-average molecular weight in the range 1000 g/mol-10 000 g/mol.

It is further particularly advantageous to use block copolymers, preferably of doubly hydrophilic block copolymers, especially of polyethylene oxide or polypropylene oxide.

The proportion of preferably surface-active substances is freely choosable in principle and can be specifically adjusted to the particular application. Preferably, however, it is in the range from 0.1 wt % to 5.0 wt %, especially in the range from 0.3 wt % to 1.0 wt %, based on the calcium salt content, especially the CaCO$_3$ content, of the particles.

The preferably sphere-shaped, preferably amorphous particles of calcium salt, especially the particles of calcium carbonate, are obtainable in a conventional manner, for example by hydrolysis of dialkyl carbonate or of alkylene carbonate in a solution comprising calcium cations.

The preparation of unstablized sphere-shaped particles of calcium carbonate is for example described in detail in the WO 2008/122358 patent application, the disclosure of which, especially regarding particularly advantageous versions of the preparation of such unstabilized sphere-shaped particles of calcium carbonate, is hereby explicitly incorporated herein by reference.

The hydrolysis of the dialkyl carbonate or of the alkylene carbonate is advantageously carried out in the presence of a hydroxide.

Substances comprising Ca$^{2+}$ ions and preferred for the purposes of the present invention are calcium halides, preferably CaCl$_2$, CaBr$_2$, especially CaCl$_2$, and also calcium hydroxide. CaCl$_2$ is used in the context of a first particularly preferred embodiment of the present invention. Ca(OH)$_2$ is used in a further particularly preferred embodiment of the present invention.

A dialkyl carbonate is used in the context of a first particularly preferred embodiment of the present invention. Particularly suitable dialkyl carbonates comprise 3 to 20, preferably 3 to 9, carbon atoms, especially dimethyl carbonate, diethyl carbonate, di-n-propyl carbonate, di-isopropyl carbonate, di-n-butyl carbonate, di-sec-butyl carbonate and di-tert-butyl carbonate, of which dimethyl carbonate is very particularly preferred in this context.

An alkylene carbonate is reacted in a further particularly preferred embodiment of the present invention. Particularly advantageous alkylene carbonates comprise 3 to 20, preferably 3 to 9, more preferably 3 to 6, carbon atoms and include especially those compounds which comprise a ring of 3 to 8, preferably 4 to 6, especially 5, atoms, with preferably 2 oxygen atoms and otherwise carbon atoms. Propylene carbonate (4-methyl-1,3-dioxolane) has proved very particularly advantageous in this context.

As far as hydroxide is concerned, alkali metal hydroxides, especially NaOH, and calcium hydroxide have been found to be particularly suitable. NaOH is used in the context of a first particularly preferred embodiment of the present invention. Ca(OH)2 is used in the context of a further particularly preferred embodiment of the present invention.

The molar ratio of $Ca^{2+}$, preferably calcium chloride, to OH—, preferably alkali metal hydroxide, in the reaction mixture is further preferably above 0.5:1 and more preferably in the range from >0.5:1 to 1:1, especially in the range from 0.6:1 to 0.9:1.

The molar ratio of $Ca^{2+}$, preferably calcium chloride, to dialkyl carbonate and/or alkylene carbonate in the reaction mixture is advantageously in the range from 0.9:1.5 to 1.1:1 and more preferably in the range from 0.95:1 to 1:0.95. The dialkyl carbonate and/or the alkylene carbonate and the $Ca^{2+}$, especially the calcium chloride, are used in an equimolar ratio in the context of a very particularly advantageous version of the present invention.

A first very particularly preferred version of the present invention does not use $Ca(OH)_2$ as $OH^-$ source. The components for the reaction therein are advantageously used in the following concentrations:
a) $Ca^{2+}$: >10 mmol/l to 50 mmol/l, preferably 15 mmol/l to 45 mmol/l, especially 17 mmol/l to 35 mmol/l;
b) dialkyl carbonate and/or
alkylene carbonate: >10 mmol/l to 50 mmol/l, preferably 15 mmol/l to 45 mmol/l, especially 17 mmol/l to 35 mmol/l;
c) $OH^-$: 20 mmol/l to 100 mmol/l, preferably 20 mmol/l to 50 mmol/l, more preferably 25 mmol/l to 45 mmol/l, especially 28 mmol/l to 35 mmol/l.

The specified concentrations each relate to the concentrations of the stated components in the reaction mixture.

A further very particularly preferred version of the present invention does use $Ca(OH)_2$, preferably milk of lime, especially saturated milk of lime, as $OH^-$ source. The components for the reaction therein are advantageously used in the following concentrations:
a) $Ca(OH)_2$: >5 mmol/l to 25 mmol/l, preferably 7.5 mmol/l to 22.5 mmol/l, especially 8.5 mmol/l to 15.5 mmol/l;
b) dialkyl carbonate and/or
alkylene carbonate: >5 mmol/l to 25 mmol/l, preferably 7.5 mmol/l to 22.5 mmol/l, especially 8.5 mmol/l to 15.5 mmol/l.

The specified concentrations each relate to the concentrations of the stated components in the reaction mixture.

The reaction of the components is preferably carried out at a temperature in the range from 15° C. to 30° C.

The specific size of the particles of calcium salt, especially of the particles of calcium carbonate, can be controlled in a conventional manner via the degree of supersaturation.

The particles of calcium salt, especially the particles of calcium carbonate, precipitate from the reaction mixture under the abovementioned conditions.

The stabilization of the preferably amorphous particles of calcium salt, especially of the preferably amorphous particles of calcium carbonate, is advantageously effected by adding the preferably surface-active substance to the reaction mixture.

This adding of the substance should only take place after the start of the reaction to form the calcium salt particles, especially the calcium carbonate particles, i.e., only after the reactants have been added, preferably no sooner than 1 minute, more preferably no sooner than 2 minutes, advantageously no sooner than 3 minutes, even more preferably no sooner than 4 minutes and especially no sooner than 5 minutes after the reactants have been mixed. The time of addition should further be chosen such that the preferably surface-active substance is added shortly before the end of the precipitation and as shortly as possible before the start of the conversion of the preferably amorphous calcium salt, especially the amorphous calcium carbonate, into a crystalline form, since the yield and purity of the "stabilized sphere-shaped amorphous calcium salt particles" can be maximized in this way. If the preferably surface-active substance is added earlier, the product obtained will generally be bimodal in that it comprises ultrafine, amorphous calcium salt particles as a by-product alongside the desired, stabilized sphere-shaped amorphous calcium salt particles. If the preferably surface-active substance is added later, the conversion of the desired "stabilized calcium salt particles" into crystalline forms will already ensue.

This is why the preferably surface-active substance is preferably added at a pH of not more than 11.5, preferably not more than 11.3 and especially not more than 11.0. A particularly advantageous addition takes place at a pH in the range from 11.5 to 10.0, preferably in the range from 11.3 to 10.5, especially in the range from 11.0 to 10.8, all measured at the reaction temperature, preferably at 25° C.

The resultant stabilized, preferably sphere-shaped, amorphous calcium salt particles can be conventionally (by centrifugation for example) dewatered and dried. Washing with acetone and/or drying in a vacuum drying cabinet is no longer absolutely necessary.

By drying "calcium salt particles of low structural water content", especially "calcium carbonate particles of low structural water content", are obtainable from the "stabilized calcium salt particles".

For the purposes of the present invention, the calcium salt particles obtained are preferably dried such that they have the desired residual water content. In a particularly advantageous procedure for this, the calcium salt particles are preferably first predried at a temperature up to 150° C. and then the calcium salt particles are preferably dried at a temperature in the range from above 150° C. to 250° C., preferably in the range from 170° C. to 230° C., more preferably in the range from 180° C. to 220° C. and especially in the range from 190° C. to 210° C. The drying preferably takes place in a circulating air drying cabinet. The time for which the calcium salt particles are dried is advantageously not less than 3 h, more preferably not less than 6 h and especially not less than 20 h.

In the context of a further particularly preferred version of the present invention, the preferably precipitated calcium salt particles, especially the preferably precipitated calcium salt particles, are essentially crystalline, especially essentially calcitic. In the context of this preferred version of the present invention, however, the presence of other constituents, especially amorphous constituents, is not categorically ruled out. Preferably, however, the proportion of other non-crystalline calcium salt forms, especially of other non-crystalline calcium carbonate forms, is below 50 wt %, more preferably below 30 wt %, even more preferably below 15 wt % and especially below 10 wt %. The proportion of non-calcitic calcium carbonate forms is further preferably below 50 wt %, more preferably below 30 wt %, even more preferably below 15 wt % and especially below 10 wt %.

The average diameter of the preferably precipitated calcium salt particles, especially the preferably precipitated calcium carbonate particles, is in principle freely choosable. It is preferably in the range from 0.05 μm to 30.0 μm and especially in the range from 0.1 μm to 15.0 μm.

For amorphous calcium salt particles, especially for amorphous calcium carbonate particles, the average diameter of the calcium salt particles is advantageously in the range from 0.05 μm to 2.0 μm, preferably below 1.75 μm, more preferably below 1.5 μm, especially below 1.2 μm. The average particle diameter in this case is further advantageously above 0.1 μm, preferably above 0.2 μm and especially above 0.3 μm.

For scalenohedral calcium salt particles, especially for scalenohedral calcium carbonate particles, the average diameter of the calcium salt particles is advantageously in the range from 0.05 μm to 2.0 μm, preferably below 1.75 μm, more preferably below 1.5 μm, especially below 1.2 μm. The average particle diameter in this case is further advantageously above 0.1 μm, preferably above 0.2 μm and especially above 0.3 μm.

Scalenohedral calcium salt particles, especially calcium carbonate particles, have further proved particularly advantageous when the average diameter is advantageously in the range from 1.0 μm to 5.0 μm, preferably below 4.5 μm, more preferably below 4.0 μm and especially below 3.5 μm. The average particle diameter in this case is further advantageously above 1.5 μm, preferably above 2.0 μm, especially above 3.0 μm.

For rhombohedral calcium salt particles, especially for rhombohedral calcium carbonate particles, the average diameter of the calcium salt particles is advantageously in the range from 0.05 μm to 2.0 μm, preferably below 1.75 μm, more preferably below 1.5 μm, especially below 1.2 μm. The average particle diameter in this case is further advantageously above 0.1 μm, preferably above 0.2 μm and especially above 0.3 μm.

Rhombohedral calcium salt particles, especially calcium carbonate particles, have further proved particularly advanatageous when the average diameter is advantageously in the range from 1.0 μm to 20.0 μm, preferably below 18.0 μm, more preferably below 16.0 μm, especially below 14.0 μm. The average particle diameter in this case is further advantageously above 2.5 μm, preferably above 4.0 μm and especially above 6.0 μm.

For needle-shaped calcium salt particles, especially for needle-shaped calcium carbonate particles, the average diameter of the calcium salt particles is advantageously in the range from 0.05 μm to 2.0 μm, preferably below 1.5 μm, more preferably below 1.0 μm, especially below 0.75 μm. The average particle diameter in this case is further advantageously above 0.1 μm, preferably above 0.2 μm and especially above 0.3 μm.

For platelet-shaped calcium salt particles, especially for platelet-shaped calcium carbonate particles, the average diameter of the calcium salt particles is advantageously in the range from 0.05 μm to 2.0 μm, preferably below 1.75 μm, more preferably below 1.5 μm, especially below 1.2 μm. The average particle diameter in this case is further advantageously above 0.1 μm, preferably above 0.2 μm and especially above 0.3 μm.

For spherulitic (sphere-shaped) calcium salt particles, especially for sphere-shaped calcium carbonate particles, it has further been found advantageous to have an average diameter which is advantageously in the range from 1.0 μm to 30.0 μm, preferably below 20.0 μm, more preferably below 18.0 μm, even more preferably below 16.0 μm and especially below 14.0 μm. The average particle diameter in this case is further advantageously above 2.5 μm, preferably above 4.0 μm, especially above 6.0 μm.

The aforementioned average particle sizes of the calcium salt particles, especially of the calcium carbonate particles, are advantageously determined in the context of the present invention by evaluation of scanning electron micrographs, preferably by only considering particles having a size of not less than 0.01 μm and forming a number average over preferably at least 20 and more preferably at least 40 particles. Methods of sedimentation analysis have further also proved particularly useful, particularly for needle-shaped calcium salt particles, the use of a Sedigraph 5100 (Micromeritics GmbH) being particularly advantageous in this context.

In the case of calcium salt particles which are not sphere-shaped, the sphere-equivalent particle size is preferably used.

The size distribution of the calcium salt particles is comparatively narrow and preferably such that not less than 90.0 wt % of all calcium salt particles, preferably of all calcium carbonate particles, have a particle diameter in the range from average particle diameter −50%, preferably in the range from average particle diameter −40%, especially in the range from average particle diameter −30%, to average particle diameter +70%, preferably average particle diameter +60%, especially average particle diameter +50%. This size distribution is preferably determined using scanning tunneling microscopy.

The shape factor of the calcium salt particles, preferably of the calcium carbonate particles, herein defined as the quotient formed from the minimum particle diameter and the maximum particle diameter, is advantageously above 0.90 and more preferably above 0.95 for not less than 90% and advantageously not less than 95% of all particles. In this context, sphere-shaped calcium salt particles are preferably only considered when they have a particle size in the range from 0.1 μm to 30.0 μm. Rhombohedral calcium salt particles are preferably only considered when they have a particle size in the range from 0.1 μm to 20.0 μm. Other calcium salt particles are preferably only considered when the particle size is in the range from 0.1 μm to 2.0 μm.

The calcium salt particles, especially the calcium carbonate particles, are further advantageously characterized by a comparatively low water content. Their water content (residual moisture at 200° C.) as a proportion of the overall weight is not more than 5.0 wt %, preferably not more than 2.5 wt %, more preferably not more than 1.0 wt %, even more preferably not more than 0.5 wt %, yet even more preferably below 0.4 wt %, advantageously below 0.3 wt %, more advantageously below 0.2 wt %, especially not more than 0.1 wt %.

In the context of the present invention, the water content of the calcium salt particles, especially the calcium carbonate particles, is preferably determined using thermogravimetric analysis, the measurement being preferably carried out under nitrogen (nitrogen flow rate preferably 20 ml/min) and advantageously over the temperature range from 40° C. or less to 250° C. or higher. The measurement is further preferably carried out at a heating rate of 10° C./min.

When amorphous calcium carbonate particles are used as calcium salt particles in the context of the present invention, they advantageously have a low content of structural water. This low structural water content is preferably below 5 mol, more preferably below 3 mol, even more preferably below 1 mol and especially below 0.5 mol of structural water per mol of calcium carbonate. In a very particularly preferred embodiment of the present invention, the amorphous calcium carbonate particles comprise no structural water.

The specific surface area of the calcium salt particles, especially of the calcium carbonate particles, is preferably in the range from 0.1 $m^2$/g to 100 $m^2$/g, more preferably in the range from 0.1 $m^2$/g to 20.0 $m^2$/g, and especially in the range from 4.0 $m^2$/g to 12.0 $m^2$/g. For rhombohedral calcium salt particles, especially for rhombohedral calcium carbonate particles, the specific surface area in the context of a particularly preferred version of the present invention is below 1.0 m²/g, preferably below 0.75 m²/g, and especially below 0.5 m²/g, while the average diameter of the rhombohedral calcium salt particles, especially of the rhombohedral calcium carbonate particles, is advantageously above 2.5 µm, preferably above 4.0 µm, and especially above 6.0 µm.

For sphere-shaped calcium salt particles, especially for sphere-shaped calcium carbonate particles, which preferably have an average diameter above 2.5 µm, preferably above 4.0 µm and especially above 6.0 µm, the specific surface area in the context of a particularly preferred version of the present invention is below 3.0 m²/g, preferably below 2.0 m²/g, and especially below 1.5 m²/g. The specific surface area in this case is further advantageously above 0.25 m²/g, preferably above 0.5 m²/g, and especially above 0.75 m²/g.

Very particular preference is given in this context to calcium salt particles, especially calcium carbonate particles, whose specific surface area remains relatively constant during drying in that it preferably changes by not more than 200%, preferably by not more than 150%, and especially by not more than 100%, all based on the initial value.

The basicity of the calcium salt particles, especially of the calcium carbonate particles, is comparatively low. Their pH as measured according to EN ISO 787-9 is preferably below 11.5, more preferably below 11.0 and especially below 10.5.

Particularly advantageous calcium salts for the purposes of the present invention include calcium phosphates, especially $Ca_3(PO_4)_2$, $CaHPO_4$, $Ca(H_2PO_4)_2$ and/or $Ca_5(PO_4)_3(OH)$, as well as calcium carbonate.

Calcium salt mixtures are also particularly suitable. They preferably include at least one calcium carbonate, especially precipitated calcium carbonate, and at least one calcium phosphate, especially $Ca_3(PO_4)_2$, $CaHPO_4$, $Ca(H_2PO_4)_2$ and/or $Ca_5(PO_4)_3(OH)$.

The weight ratio therein of calcium salt, especially calcium carbonate, to calcium phosphate is preferably in the range from 99:1 to 1:99, and especially in the range from 50:50 to 99:1.

In the case of the composite particles according to claim 1, the small particles are required by the present invention to comprise precipitated particles of calcium carbonate which have an average particle size in the range from 0.01 µm to 1.0 mm. On this premise, the above-described preferred versions regarding the calcium salt of the small particles also apply to this embodiment of the present invention.

In the context of the present invention, the microstructured composite particles are obtainable by a process comprising combining large particles with small particles, wherein the large particles have an average particle diameter in the range from 0.1 µm to 10 mm, preferably in the range from 0.5 µm to 2.0 mm and especially in the range from 1.0 µm to 500.0 µm, the average particle diameter of the small particles is not more than 1/10 of the average particle diameter of the large particles and preferably lies in the range from 0.01 µm to 1.0 mm, preferably in the range from 0.02 µm to 200 µm, advantageously in the range from 0.05 µm to 30.0 µm, and especially in the range from 0.1 µm to 15.0 µm.

The small particles form an arrangement on the surface of the large particles and/or an inhomogeneous distribution within the large particles.

An "inhomogeneous" distribution of small particles within large particles is here to be understood as meaning a distribution of small particles within large particles which is not homogeneous (uniform). Preferably, the composite particles contain at least one first region comprising at least two, preferably at least three, more preferably at least four and especially at least five small particles, and at least one other region which has the same volume and the same shape as the first region but comprises a different number of small particles.

Furthermore, the weight ratio of polymer to calcium salt, preferably calcium carbonate, especially precipitated calcium carbonate, in the particle interior is greater than the weight ratio of polymer to calcium salt, preferably calcium carbonate, especially precipitated calcium carbonate, in the exterior of the particles. Advantageously the weight ratio of polymer to calcium salt, preferably calcium carbonate, especially precipitated calcium carbonate, in the particle interior is above 50:50, preferably above 60:40, advantageously above 70:30, more preferably above 80:20, even more preferably above 90:10, yet even more preferably above 95:5, and especially above 99:1. Furthermore, the weight ratio of calcium salt, preferably calcium carbonate, especially precipitated calcium carbonate, to polymer in the exterior of the particles, preferably in the preferential exterior of the particles, is above 50:50, preferably above 60:40, advantageously above 70:30, more preferably above 80:20, even more preferably above 90:10, yet even more preferably above 95:5, and especially above 99:1.

Particle interior in this context refers to the region which has a maximum distance of r/2 from the particle midpoint, where the particle midpoint preferably corresponds to the center of gravity of the particle and where r corresponds to the radius of the compact sphere-shaped particle which consists of the same components in the same mixing ratios and with the same densities.

Particle exterior refers to the region which has a distance above r/2 from the particle midpoint. Preferential particle exterior refers to the region which has a distance above 0.793 r from the particle midpoint. Here particle midpoint and r are each as defined above.

Particularly preferred composite particles for the purposes of the present invention are sphere-shaped. The average diameter of the composite particles is preferably in the range from 0.1 µm to 12 mm and especially in the range from 0.5 µm to 2.4 mm.

In the context of a particularly preferred embodiment of the present invention, the composite particles of the present invention comprise a core and a sheath, wherein the core preferably comprises at least one polymer, especially at least one thermoplastic polymer, and preferably has an average diameter in the range from 0.1 µm to 10 mm and especially in the range from 0.5 µm to 2 mm. The sheath preferably comprises at least one calcium salt, preferably at least one calcium carbonate, especially at least one precipitated calcium carbonate, and preferably has an average thickness of not more than 20%, based on the core diameter.

The average diameters of the composite particles, of the large particles and of the small particles and also the aforementioned dimensions of length are advantageously determined according to the present invention from micrographs, if necessary from electron micrographs. Sedimentation analyses are also particularly advantageous for determining the average diameters of the large particles and of the small particles, and in this case the use of a Sedigraph 5100 (Micromeritics GmbH) is particularly advantageous. Particle size analyses with laser diffraction have also proved very useful for the composite particles, and in this case use of a HELOS/BR laser diffraction sensor from Sympatec GmbH is particularly advantageous. This sensor preferably comprises a RODOS dry disperser.

In the case of particles which are not sphere-shaped, the sphere-equivalent particle size is preferably used.

As for the rest, these particulars as well as all other particulars in the present description relate to a temperature of 25° C., unless otherwise stated.

The composite particles of the present invention are comparatively compact. Preferably, the proportion of sub-regions in the particle interior which have a density below 0.5 g/cm$^3$ and especially below 0.25 g/cm$^3$ is below 10.0%, preferably below 5.0% and especially below 1.0%, all based on the overall volume of the composite particles.

The weight fraction of calcium salt, preferably calcium carbonate, especially precipitated calcium carbonate, based on the overall weight of the composite particles, is preferably not less than 0.1 wt %, more preferably not less than 1.0 wt %, even more preferably not less than 5.0 wt %, and lies advantageously in the range from 5.0 wt % to 50.0 wt %, more advantageously in the range from 10.0 wt % to 30.0 wt % and especially in the range from 15.0 wt % to 25.0 wt %.

The weight fraction of polymer, preferably thermoplastic polymer, based on the overall weight of the composite particles, is preferably not less than 0.1 wt %, more preferably not less than 1.0 wt %, even more preferably not less than 5.0 wt %, and lies advantageously in the range from 5.0 wt % to 95.0 wt %, more advantageously in the range from 70.0 wt % to 90.0 wt % and especially in the range from 75.0 wt % to 85.0 wt %.

The composite particles of the present invention are characterized inter alia by a very firm combination of the small particles with the large particles. The very firm combination of the small particles with the large particles may preferably be verified by exposing the composite particles to a mechanical stress, especially by shake extraction of the composite particles with water at 25° C., preferably as per the procedure described in Organikum, 17th edition, VEB Deutscher Verlag der Wissenschaften, Berlin, 1988, section 2.5.2.1 "Shake extraction of solvents/suspensions", page 56 57. Shake time is preferably not less than 1 minute, more preferably not less than 5 minutes, especially 10 minutes, and preferably does not lead to a significant change in the shape, size and/or composition of the composite particles. It is particularly preferable for not less than 60 wt %, preferably not less than 70 wt %, more preferably not less than 80 wt %, even more preferably not less than 90 wt %, advantageously not less than 95 wt % and especially not less than 99 wt % of the composite particles to be unchanged with regard to their composition, size and preferably shape after the shake test.

The composite particles of the present invention are obtainable in a conventional manner, for example by a one-step method, especially by application of a precipitate or coating, preferably by coating with millbase.

In a particularly advantageous procedure, however, polymer particles and calcium salt particles are brought into contact with each other and combined with each other through the action of mechanical forces. This is advantageously done in a suitable mixer or in a mill, especially in an impact mill, a pin mill or in an ultrarotor mill. Rotor speed in the latter case is preferably above 1 m/s, more preferably above 10 m/s, even more preferably above 25 m/s and especially in the range from 50 m/s to 100 m/s.

In a particularly preferred embodiment of the present invention, this procedure causes the calcium salt particles to penetrate into the interior of the polymer particles and to become as completely covered by the polymer as possible, so they are not discernible from the outside. Particles of this type can be processed and used like the polymer without calcium salt particles, but do exhibit the improved properties of the composite particles according to the present invention.

In a further particularly preferred embodiment of the present invention, this procedure does not cause the calcium salt particles to penetrate into the interior of the polymer particles in that, on the contrary, the calcium salt particles become fixed on the surface of the polymer particles and are easily discernible from the outside.

In the context of a first particularly preferred version of the present invention, the composite particles are produced in accordance with the procedure described in the JP62083029 A patent application. Large particles (referred to as "mother particles") are surface coated with small particles (referred to as "baby particles"). This is preferably accomplished using a surface-modifying device ("hybridizer") which comprises a high-speed rotor, a stator and a sphere-shaped vessel, preferably comprising internal blades. The use of NARA hybridization systems, which preferably have an outer rotor diameter of 118 mm, especially an NHS 0 or NHS 1 hybridization system from NARA Machinery Co. Ltd., has proved particularly useful in this context.

The mother and baby particles are mixed, preferably very finely divided and introduced into the hybridizer. There the mixture is preferably further very finely divided and preferably exposed repeatedly to mechanical forces, especially impact forces, compressive forces, frictional forces and shearing forces as well as the mutual interactions between the particles in order that the baby particles may become uniformly embedded in the mother particles.

Preferred rotor speeds are said to range from 50 m/s to 100 m/s, based on the circumferential velocity.

For further details regarding this process, especially in relation to the particularly advantageous embodiments, reference is made to JP62083029 A, the disclosure of which including the particularly advantageous processing versions is explicitly incorporated in the present application by reference.

In the context of a further particularly preferred version of the present invention, the composite particles are prepared in accordance with the procedure described in the DE 42 44 254 A1 patent application. Accordingly, a process for producing composite particles by securing a substance to the surface of a thermoplastic material is particularly advantageous when the thermoplastic material has an average particle diameter of 100 µm to 10 mm and the substance has a smaller particle diameter and a better thermal stability than the thermoplastic material, said process especially comprising the steps of:

first heating the substance which has the smaller particle diameter and the better thermal stability than the thermoplastic material to a temperature preferably not less than the softening point of the thermoplastic material while stirring in an apparatus preferably having a stirring mechanism and a heating means;

introducing the thermoplastic material into the apparatus; and securing the substance having the better thermal stability to the surface of the thermoplastic material.

For further details regarding this process, especially in relation to the particularly advantageous embodiments, reference is made to DE 42 44 254 A1, the disclosure of which including the particularly advantageous processing versions is explicitly incorporated in the present application by reference.

In the context of yet a further particularly preferred version of the present invention, the composite particles are prepared in accordance with the procedure described in the EP 0 922 488 A1 patent application and/or in U.S. Pat. No. 6,403,219 B1. Accordingly, a process for producing composite particles by securing or adhesively attaching fine particles to the surface of a solid particle which acts as a core by application of an impact and subsequent growth of one or more crystals on the core surface is particularly advantageous.

For further details regarding this process, especially in relation to the particularly advantageous embodiments, reference is made to the EP 0 922 488 A1 patent application and/or U.S. Pat. No. 6,403,219 B1, the disclosures of which including the particularly advantageous processing versions are explicitly incorporated in the present application by reference.

In the context of a further particularly preferred embodiment of the present invention, the composite particles are subjected to a fixing operation in accordance with the procedure described in the EP 0 523 372 A1 patent application. This is especially advantageous for composite particles obtained in accordance with the method described in the JP62083029 A patent application. The composite particles are preferably fixed therein by thermal spraying of a plasma, preferably by using a "reduced pressure plasma spraying device", which preferably has an output level of not less than 30 kW, especially the apparatus described in EP 0 523 372 A1.

For further details regarding this process, especially in relation to the particularly advantageous embodiments, reference is made to the EP 0 523 372 A1 patent application, the disclosure of which including the particularly advantageous processing versions is explicitly incorporated in the present application by reference.

The composite particles of the present invention are characterized by an outstanding profile of properties. In addition to outstanding mechanical properties, they exhibit very good dispersibility, excellent grindability, an extremely low dust propensity and also a comparatively high isotropy.

Furthermore, the presence of the calcium salt, preferably the presence of the calcium carbonate, in the composite particles provides pH stabilization (buffering) in later applications, especially in those polymers as contain acid groups or may release acids under certain conditions. They include polyvinyl chloride and polylactic acid for example.

The composite particles of the present invention can further be substituted for any other, more costly engineering materials present in order to thereby reduce the cost of the end product.

The composite particles of the present invention can be further processed in a comparatively simple manner, since, according to the solution of the present invention, there is only one component to process (namely the composite particles) and it is no longer necessary to process two components (calcium salt and polymer). Because of the firm combination between the polymer and the calcium salt there are no dispersing problems.

Furthermore, composite particle microstructure, porosity and permeability can be controlled in a specific manner by choosing the proportions and size of the particular individual components. The entirely controllable permeability, the entirely controllable porosity and the entirely controllable isotropy of the composite particles can in turn be used to control the end structure of the resultant structural components, especially their microstructure, their porosity and their permeability, in a specific manner.

There is generally no need to add further processing aids, especially specific solvents, to process the composite particles of the present invention. This extends the possible uses of the composite particles according to the present invention in the pharma and food sectors in particular.

The composite particles of the present invention can be used directly as such. Owing to their outstanding profile of properties, however, the composite particles of the present invention are particularly useful as an additive, more preferably as a polymer additive, as an adjuvant or as a starting material for the production of structural components, for applications in biomedical engineering and/or in microtechnology and/or for the production of foamed articles. Particularly preferred biomedical applications include preferably resorbable implants. Particularly advantageous areas of use include injection-molded bolts, pressed plaques, especially melt-pressed plaques, foamed implants and also free-flowing powders for selective methods of fabrication, the overall particle size in the latter case preferably being below 3 mm and preferably above 0.5 μm.

When used as a polymer additive, the composite particles of the present invention are preferably added to at least one polymer, especially a thermoplastic polymer, as matrix polymer. Particular preference here is given to polymers which can also be used as a component of the composite particles according to the present invention. To avoid repetition, therefore, reference is made to the above observations, especially with regard to the preferred forms of the polymer. Very particularly preferred matrix polymers include polyvinyl chloride (PVC), polyurethane (PU), silicone, polypropylene (PP), polyethylene (PE) and polylactic acid (PLA).

In the context of the present invention, the matrix polymer and the polymer of the composite particles are preferably miscible with each other at the use temperature and more preferably are chemically identical.

Particularly preferred compositions contain 40.0 wt % to 99.9 wt % of at least one matrix polymer and 0.1 wt % to 50.0 wt % of at least one composite particle according to the present invention.

The composition is obtainable in a conventional manner by mixing the components.

The composition can then be further processed in a conventional manner, especially by pelletization, grinding, extrusion, injection molding or else foaming.

The composite particles of the present invention can further be further processed and/or used directly, i.e., without addition of additional polymers.

The advantages of composite particles according to the present invention are particularly apparent when the composite particles are pelletized, ground, extruded, injection molded, melt pressed and/or foamed.

In the context of the present invention, polymer foams are preferably produced by generating or incorporating a gaseous phase in a composition comprising the composite particles of the present invention and optionally at least one matrix polymer. The purpose here is to achieve as uniform a distribution of the gas in the composition as possible in order that a uniform and homogeneous foam structure may be obtained. The gas can be incorporated in various ways.

The gas phase is preferably generated by adding a blowing agent. Blowing agents are substances which release gases through chemical reactions (chemical blowing agents) or through phase transition (physical blowing agents). In foam extrusion or foam injection molding, the chemical blowing agent is admixed to the composition in the form of a masterbatch or physical blowing agent is directly injected into the melt of the composition under pressure. Injection is known as mechanical blowing and finds use in the processing of thermoplastic polymers in particular.

For this use in particular, the composite particles of the present invention advantageously have a structure whereby a fluidic substance, preferably the blowing agent, can penetrate into the polymer and preferably can effect at least partial solution of said polymer. In the case of composite particles having a core comprising at least one preferably thermoplastic polymer and a sheath comprising at least one calcium salt, preferably at least one calcium carbonate, especially at least one precipitated calcium carbonate, the sheath is at least partly permeable for the fluidic substance, especially for the blowing agent. This is preferably achieved by not less than 0.1%, preferably not less than 0.5% and especially from 1.0% to 5% of the core surface not being coated with calcium salt, preferably not with calcium carbonate and especially not with precipitated calcium carbonate. This effect is preferably amplified by the gaps between individual calcium salt particles, preferably between the individual calcium carbonate particles, especially between the individual precipitated calcium carbonate particles, which preferably are present and lead to the formation of appropriate microchannels for the fluidic substance, especially for the blowing agent.

In the context of a particularly preferred embodiment of the present invention, the composite particles are foamed up in accordance with the procedure described in the publication M. Avella, S. Cosco, M. L. Di Lorenzo, E. Di Pace, M. E. Errico Influence of $CaCO_3$ Nanoparticles Shape on Thermal and Crystallization Behavior of Isotactic Polypropylene based Nanocomposites Journal of Thermal Analysis and calorimetry, vol. 80 (2005) 131-136. The composite particles of the present invention, which preferably comprise at least one resorbable polymer, preferably at least one resorbable polyester, especially polylactic acid, are preferably blown therein with $CO_2$, preferably under high pressure, conveniently at room temperature. The $CO_2$ is taken up by the polymer, preferably lowering the glass transition temperature thereof. Pressure reduction causes the composite particles to foam up and preferably fill out the mold, preferably a Teflon mold, exactly. The process thereby particularly enables the incorporation of thermolabile substances, especially antibiotics and osteoinductive proteins.

EXAMPLES

The present invention will now be further illustrated by several examples without any intention of thereby narrowing the inventive concept.

Characterization

The properties of the microstructured composite particles were determined as follows:

Electron Microscope

Scanning electron micrographs were prepared using a high-voltage electron microscope (Zeiss, DSM 962) at 15 kV. The samples were sprayed with a gold-palladium layer.

Thermogravimetric Analysis (TGA)

Thermogravimetric analysis was carried out with a Perkin Elmer STA 6000 under nitrogen (nitrogen flow rate: 20 ml/min) in the range from 40° C. to 1000° C. at a heating rate of 10° C./min.

Example 1

Microstructured composite particles comprising amorphous calcium carbonate and an amorphous polylactide (PLA) were prepared in accordance with the method described in JP 62083029 A by using the NHS 0 apparatus. Cold water at 12° C. was used for cooling. A polylactide pellet material (average particle size 3 mm) was used as mother particles and amorphous calcium carbonate powder (DSACC; average particle size 1 μm) was used as the baby particles.

16 g of polylactide pellet material were mixed with 4 g of $CaCO_3$ powder and filled at 5000 rpm. The rotor speed of the assembly was adjusted to 16 000 rpm (100 m/s) and the added materials were processed for 1 min. This procedure was repeated with the same quantities of materials and the same machine settings. Altogether 38 g of structured composite particles were obtained.

Figure 1A:
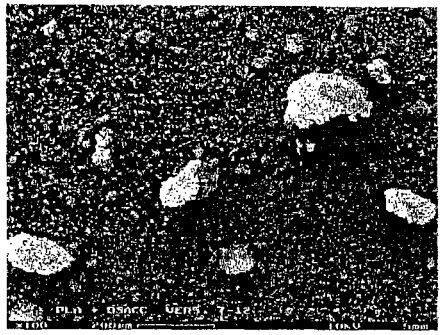
FIGS. 1a, 1b, and 1c depict the results of an SEM analysis showing a PLA surface substantially covered with sphere-shaped DSACC particles in Example 1.
Figure 1B:
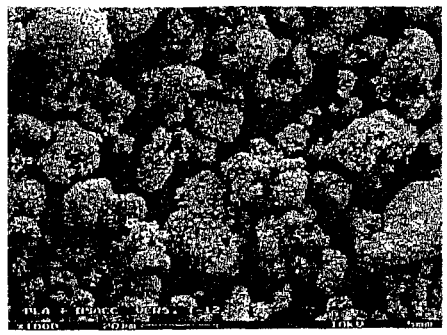
Figure 1C:
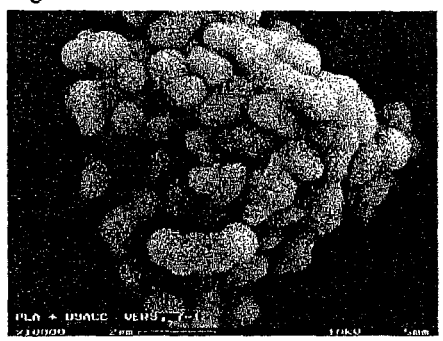

SEM analysis showed that the PLA surface is substantially covered with the sphere-shaped DSACC particles (see FIG. 1a, 1b, 1c).

Example 2

Microstructured composite particles comprising calcium carbonate spheres (spherulites; SPH) and an amorphous polylactide (PLA) were prepared as described in Example 1 using NHS 0. The same polylactide pellet material as described in Example 1 was used as mother particles, while calcium carbonate spheres (spherulites) having an average particle diameter of 7 μm were used as the baby particles.

16 g of polylactide pellet material were mixed with 4 g of $CaCO_3$ powder and filled at 5000 rpm. The rotor speed of the assembly was adjusted to 16 000 rpm (100 m/s) and the added materials were processed for 1 min. Altogether 5 repeats were carried out with the same quantities of materials and the same machine settings. Altogether 85 g of structured composite particles were obtained.

Figure 2A:
FIGS. 2a and 2b depict the results of an SEM analysis showing a PLA surface only partly covered with calcium carbonate spheres (spherulites) in Example 2.
Figure 2B:
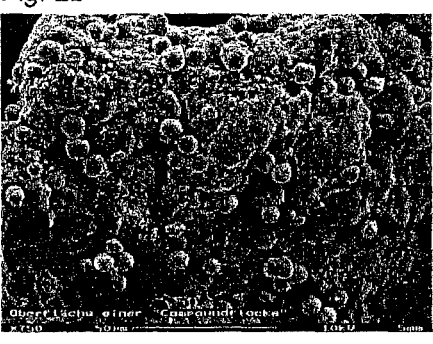

The SEM analysis of the structured composite particles obtained is depicted on the following SEM pictures. The PLA surface is only partly covered with the calcium carbonate spheres (spherulites) (see FIG. 2a, 2b).

Example 3

Microstructured composite particles comprising a calcium carbonate of mixed particulate shape (scalenohedra and needles; Schaefer Precarb® 400) and a fine powder based on polyamide-12 (PA12) were prepared using NHS 1. Cold water at 12° C. was used for cooling. PA12 (average particle size 50 μm) was used as mother particles, while Schaefer Precarb® 400 calcium carbonate (average particle size 0.7 μm) was used as the baby particles.

85 g of PA12 powder were mixed with 15 g of Schaefer Precarb® 400 CaCO₃ powder and filled at an assembly rotor speed of 4000 rpm (50 m/s). The added materials were processed for 1 min. Altogether 8 repeats were carried out with the same amounts of materials and the same machine settings. Altogether about 760 g of structured composite particles were obtained.

Figure 3A:
FIGS. 3a and 3b depict the results of an SEM analysis showing structured composite particles obtained in Example 3; and, FIGS. 4a and 4b depict the results of an SEM analysis showing structured composite particles obtained in Example 4.
Figure 3B:
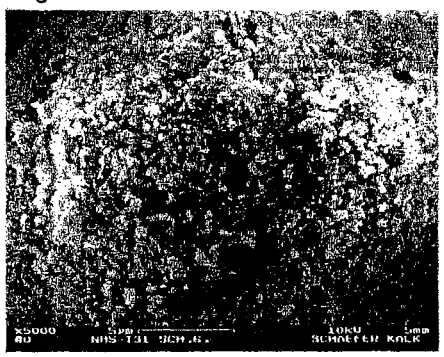

The SEM analysis of the structured composite particles obtained is depicted in FIG. 3a, 3b.

The CaCO₃ content determined using thermogravimetric analysis was 14.4% of PCC.

The particle size distribution of the structured composite particles obtained was determined using laser diffraction (Sympatec, Helos) as d50=48 µm.

Example 4

Microstructured composite particles comprising a calcium carbonate of mixed particulate shape (scalenohedra and needles; Schaefer Precarb® 400) and a fine powder based on polyamide-12 (PA12) were prepared using NHS 1. Cold water at 12° C. was used for cooling. PA12 (average particle size 50 µm) was used as mother particles, while Schaefer Precarb® 400 calcium carbonate (average particle size 0.7 µm) was used as the baby particles.

85 g of PA12 powder were mixed with 15 g of Schaefer Precarb® 400 CaCO₃ powder and filled at an assembly rotor speed of 8000 rpm (100 m/s). The added materials were processed for 3 min. Altogether 2 repeats were carried out with the same amounts of materials and the same machine settings. Altogether about 196 g of structured composite particles were obtained.

Figure 4A:
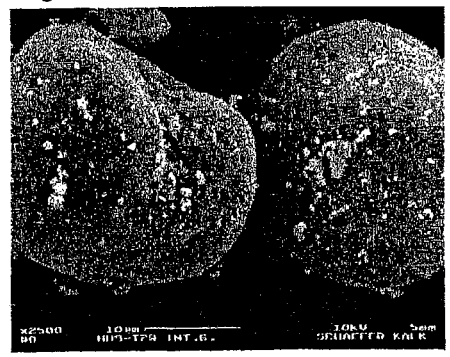
Figure 4B:
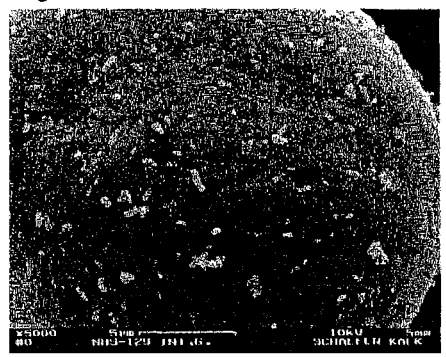

The SEM analysis of the structured composite particles obtained is depicted in FIG. 4a, 4b.

The CaCO₃ content determined using thermogravimetric analysis was 14.1% of PCC.

The particle size distribution of the structured composite particles obtained was determined using laser diffraction (Sympatec, Helos) as d50=51 µm.

What is claimed is:

1. A biomedical article, wherein the biomedical article is an implant comprising microstructured composite particles obtained by a process comprising combining large particles with small particles, wherein:
   the large particles have an average particle diameter in the range from 0.1 µm to 10 mm,
   an average particle diameter of the small particles is not more than 1/10 of the average particle diameter of the large particles,
   the large particles comprise at least one resorbable polymer,
   the small particles comprise calcium carbonate, and
   the small particles form at least one of an arrangement on the surface of the large particles and a non-uniform distribution within the large particles,
   wherein the small particles comprise precipitated particles of calcium carbonate which have an average particle size in the range from 0.01 µm to 1.0 mm.

2. The biomedical article as claimed in claim 1, wherein the large particles comprise at least one thermoplastic polymer.

3. The biomedical article as claimed in claim 1, wherein the large particles comprise at least one resorbable polymer.

4. The biomedical article as claimed in claim 1, wherein the large particles comprise at least one of poly-D-lactic acid, poly-L-lactic acid, and poly-D,L-lactic acid.

5. The biomedical article as claimed in claim 1, wherein the large particles comprise at least one polyamide.

6. The biomedical article as claimed in claim 1, wherein the small particles comprise at least one calcium phosphate.

7. The biomedical article as claimed in claim 6, wherein the small particles comprise $Ca_3(PO_4)_2$, $CaHPO_4$, $Ca(H_2PO_4)_2$ and/or $Ca_5(PO_4)_3(OH)$.

8. The biomedical article as claimed in claim 1, wherein the composite particles comprise a core and a sheath, wherein the core has an average diameter in the range from 0.5 µm to 2.0 mm, and wherein the sheath has an average thickness of not more than 20%, based on the core diameter.

9. The biomedical article as claimed in claim 1, wherein the implant comprises the composite particles dispersed in a matrix polymer.

10. The biomedical article as claimed in claim 9, wherein the large particles comprise a biopolymer.

11. The biomedical article as claimed in claim 10, wherein the large particles comprise a resorbable biopolymer.

12. The biomedical article as claimed in claim 11, wherein the implant is in the form of a foam.

13. A biomedical article, wherein the biomedical article is an implant comprising microstructured composite particles obtained by a process comprising combining large particles with small particles, wherein
   the large particles have an average particle diameter in the range from 0.1 µm to 10 mm,
   an average particle diameter of the small particles is not more than 1/10 of the average particle diameter of the large particles,
   the large particles comprise at least one polymer,
   the small particles comprise at least one calcium salt, and
   the small particles form at least one of an arrangement on the surface of the large particles and a non-uniform distribution within the large particles,
   wherein the large particles comprise at least one resorbable polyester having a number-average molecular weight in the range from 500 g/mol to 1,000,000 g/mol.

14. The biomedical article as claimed in claim 13, wherein the calcium salt comprises calcium carbonate.

15. The biomedical article as claimed in claim 13, wherein the calcium salt has an aspect ratio below 5.

16. The biomedical article as claimed in claim 14, wherein the calcium salt comprises precipitated calcium carbonate.

17. The biomedical article as claimed in claim 13, wherein the calcium salt comprises sphere-shaped calcium carbonate.

18. The biomedical article as claimed in claim 13, wherein the calcium salt comprises stabilized particles of calcium carbonate, wherein the particles of calcium carbonate comprise at least one substance having a molar mass above 100 g/mol and satisfying the formula $R—X_n$, where the radical R represents a radical comprising at least one carbon atom, the radical X represents a group comprising at least one oxygen atom and at least one carbon atom, sulfur atom, phosphorus atom or nitrogen atom, and n represents a number in the range from 1 to 20.

19. The biomedical article as claimed in claim 13, wherein the weight fraction of calcium salt, based on the overall weight of the composite particles, is not less than 0.1 wt %.

20. The biomedical article as claimed in claim 13, wherein the implant comprises the composite particles dispersed in a matrix polymer.

21. The biomedical article as claimed in claim 20, wherein the implant is in the form of a foam.

* * * * *